United States Patent [19]
Kondo

[11] Patent Number: 6,081,727
[45] Date of Patent: Jun. 27, 2000

[54] TRANSMISSION POWER CONTROL SYSTEM CAPABLE OF DISABLING COMMUNICATION OF A MOBILE TERMINAL WHICH CARRIES OUT AN ABNORMAL OPERATION

[75] Inventor: Seiji Kondo, Saitama, Japan

[73] Assignee: NEC Corporation, Tokyo, Japan

[21] Appl. No.: 09/080,406

[22] Filed: May 18, 1998

[30] Foreign Application Priority Data

May 16, 1997  [JP]  Japan ..................................... 9-126590

[51] Int. Cl.$^7$ ....................................................... H04B 1/00
[52] U.S. Cl. ........................... 455/522; 455/69; 455/423; 455/528; 340/825.5
[58] Field of Search ............................. 455/522, 69, 517, 455/528, 68, 575, 423, 425, 67.1; 340/825.5, 825.51, 825.52; 370/331; 375/200

[56] References Cited

U.S. PATENT DOCUMENTS

| | | | |
|---|---|---|---|
| 4,736,461 | 4/1988 | Kawasaki et al. | 455/343 |
| 5,003,619 | 3/1991 | Morris et al. | 455/69 |
| 5,204,970 | 4/1993 | Stengel et al. | 455/69 |
| 5,220,678 | 6/1993 | Feei | 455/69 |
| 5,535,429 | 7/1996 | Bergenlid et al. | 455/507 |
| 5,640,414 | 6/1997 | Blakeney, II et al. | 375/200 |
| 5,678,198 | 10/1997 | Lemson | 455/67.1 |
| 5,819,171 | 10/1998 | Hoogerwerf et al. | 455/410 |
| 5,930,242 | 7/1999 | Mimura | 370/331 |

*Primary Examiner*—William G. Trost
*Assistant Examiner*—Sonny Trinh
*Attorney, Agent, or Firm*—Foley & Lardner

[57] ABSTRACT

In a mobile communication network including a radio base station ($50_1$) having a service area and a mobile terminal (13) present within the service area, a transmission power control system includes in the fixed station an abnormal terminal detecting part (48, 49, 52) for detecting the mobile terminal as an abnormal terminal when the mobile terminal does not decrease the transmission power after a transmission power control part (37, 48, 52) transmits the mobile terminal with a control signal requesting a decrease of transmission power of the mobile terminal. The abnormal terminal detecting part transmits, when detects the abnormal terminal, the abnormal terminal with a forced communication-disabling signal which is for use in the abnormal terminal in forcedly disabling communication when the abnormal terminal receives the forced communication-disabling signal. The transmission power control part carries out transmission power control of the mobile terminal by transmitting, in dependence upon a signal power of a received signal received from the mobile terminal, the mobile terminal with the control signal. The mobile communication network is typically a CDMA (Code Division Multiple Access) communication network.

11 Claims, 5 Drawing Sheets

TRANSMISSION POWER CONTROL SYSTEM CAPABLE OF DISABLING COMMUNICATION OF A MOBILE TERMINAL WHICH CARRIES OUT AN ABNORMAL OPERATION

BACKGROUND OF THE INVENTION

This invention relates to a transmission power control system for a mobile communication network.

As a mobile communication network such as a cellular system, use is made of various types of multiple access networks. One of these networks is a code division multiple access (hereinafter simply called CDMA) communication network in which each channel is assigned with a specific code. A modulation wave of a common carrier frequency is spectrum-spread by the use of this code to be transmitted to a common repeater. At a receiving section, synchronization is established for each code to identify a desired channel.

The mobile communication network of such a CDMA network generally comprises a plurality of terminals (mobile terminals or mobile stations) and a base station radio equipment (radio base station) as a repeater. In the mobile communication network, reception energies of uplink communication channels from those terminals communicating with the base station radio equipment are equalized irrespective of locations of the terminals to make the terminals carry out communication by the use of the common carrier frequency. In order to realize the above, transmission power control for the uplink communication channels is carried out as described in the publications of TIA (Telecommunications Industry Association), EIA (Electronic Industries Association), and IS-95.

Figure 1:
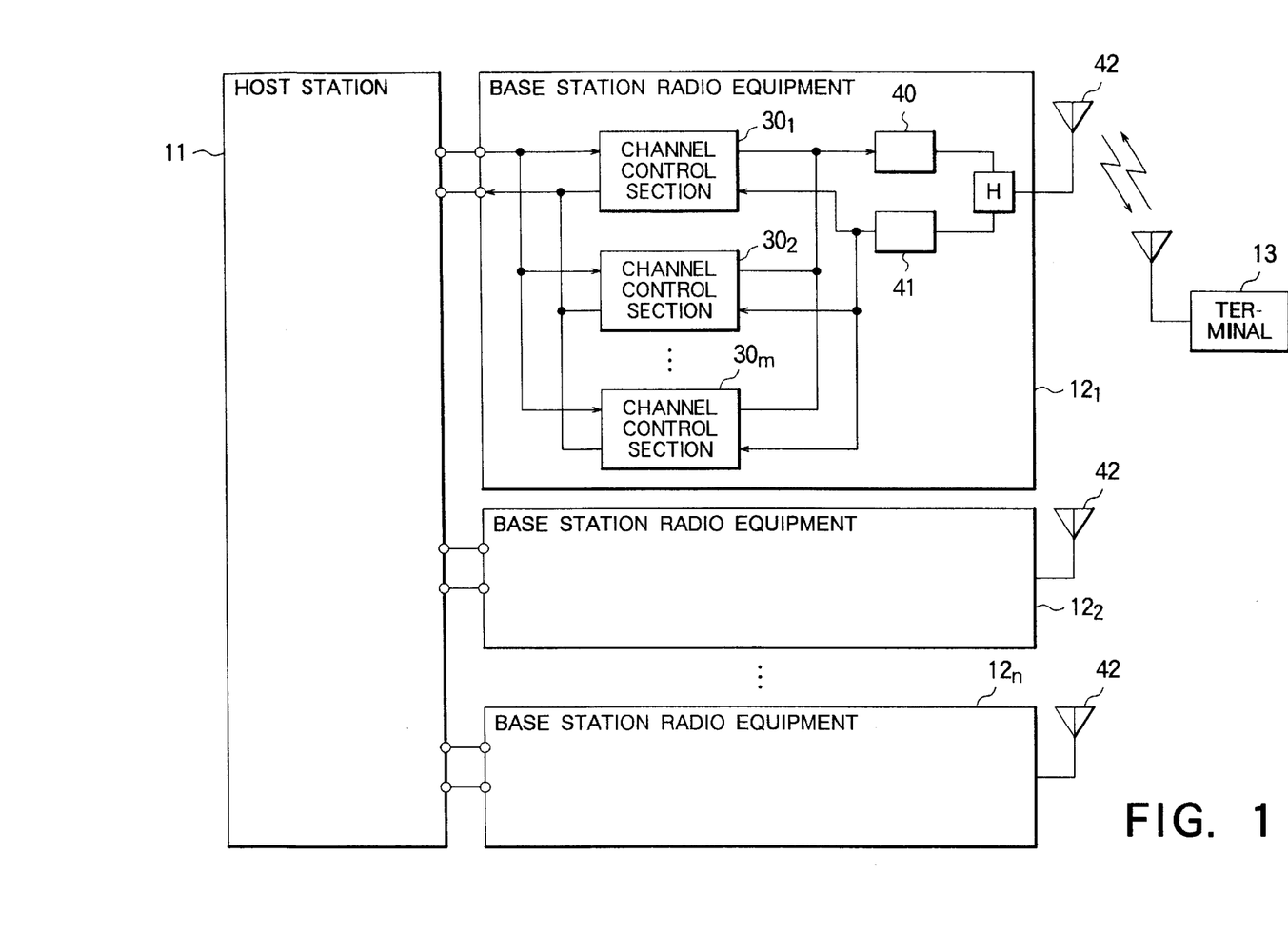
FIG. 1 is a block diagram of a mobile communication network to which a conventional transmission power control system and a transmission power control system according to this invention are applicable is.

FIG. 1 is a block diagram showing an entire structure of a mobile communication network of a CDMA network. The mobile communication network comprises a host station 11, first through n-th (n being an integer not smaller than two) base station radio equipments $12_1$, $12_2$, ..., and $12_n$ connected to the host station 11, and a plurality of terminals or mobile terminals 13 (only one being illustrated in the figure). The first base station radio equipment $12_1$ comprises channel control sections $30_1$, $30_2$, ..., and $30_m$, m (m being an integer not smaller than two) in number, similar in structure to one another, an equipment-side transmitter 40, an equipment-side receiver 41, and an equipment-side antenna 42. Each of the base station radio equipments $12_2$ through $12_n$ is similar in structure to the base station radio equipment $12_1$. The terminal 13 carries out communication, moving through service areas (not shown) assigned to the first through the n-th base station radio equipments $12_1$ to $12_n$.

In the above-mentioned mobile communication network, an uplink signal on an uplink communication channel to be transmitted from the terminal 13 to the host station 11 is received, for example, through the equipment-side antenna 42 of the first base station radio equipment $12_1$ and demodulated by the equipment-side receiver 41 of the radio equipment $12_1$ into a demodulated signal. The demodulated signal is decoded, for example, by the channel control section $30_1$ in the radio equipment $12_1$ and then transmitted to the host station 11. On the other hand, a signal to be transmitted from the host station 11 to the terminal 13 is encoded, for example, by the channel control section $30_1$ of the first base station radio equipment $12_1$, modulated by the equipment-side transmitter 40, and thereafter transmitted to the terminal 13 as a downlink signal on a downlink communication channel via the equipment-side antenna 42.

Figure 2:
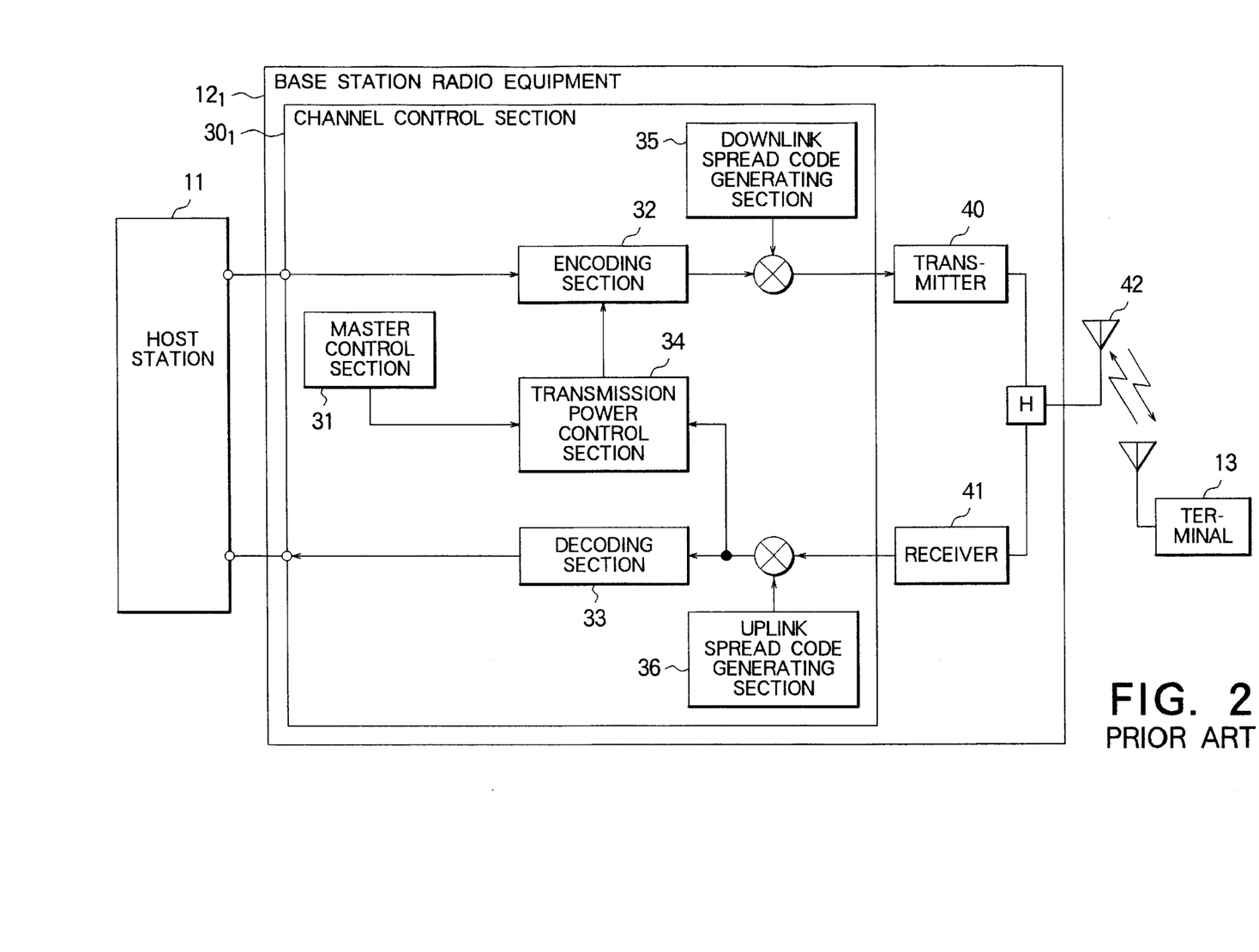
FIG. 2 is a block diagram for use in describing a conventional transmission power control system.

FIG. 2 is a block diagram for describing a conventional transmission power control system for the uplink communication channel in detail. For convenience of illustration, the channel control section $30_1$ alone is illustrated in the figure among the channel control sections $30_1$ through $30_m$ in the first base station radio equipment $12_1$. The channel control section $30_1$ comprises a master control section 31, an equipment-side encoding section 32, an equipment-side decoding section 33, a transmission power control section 34, an equipment-side downlink spread code generating section 35, and an equipment-side uplink spread code generating section 36.

In the base station radio equipment $12_1$, the uplink signal on the uplink communication channel from the terminal 13 is received through the equipment-side antenna 42 and demodulated by the equipment-side receiver 41 into the demodulated signal. The demodulated signal is correlation-demodulated by the use of a terminal-specific spread code and then supplied to the transmission power control section 34 and the equipment-side decoding section 33. The terminal-specific spread code is set in the uplink spread code generating section 36 of the channel control section $30_1$ selected to communicate with the terminal 13, simultaneously when the host station 11 assigns the communication channel to the terminal 13. The transmission power control section 34 measures a reception Eb/No ratio representative of a density ratio of signal power (reception energy) of the uplink communication channel from the terminal 13 per one bit to noise power (interference energy from other terminals) and compares the reception Eb/No ratio thus measured and a reference Eb/No ratio set in the master control section 31. As the reference Eb/No ratio, a same value is set in all the channel control sections $30_1$ through $30_m$ so as to maintain similar communication quality in all terminals currently communicating.

If the reception Eb/No ratio is greater than the reference Eb/No ratio, this means that the terminal 13 carries out transmission with excessive power. In this event, the transmission power control section 34 produces a transmission power control signal requesting a decrease of uplink transmission power. On the contrary, if the reception Eb/No ratio is smaller than the reference Eb/No ratio, this means that the terminal 13 carries out transmission with insufficient power. In this event, the transmission power control section 34 produces a transmission power control signal requesting an increase of the uplink transmission power. The transmission power control signal produced by the transmission power control section 34 is delivered to the equipment-side encoding section 32.

Figure 3:
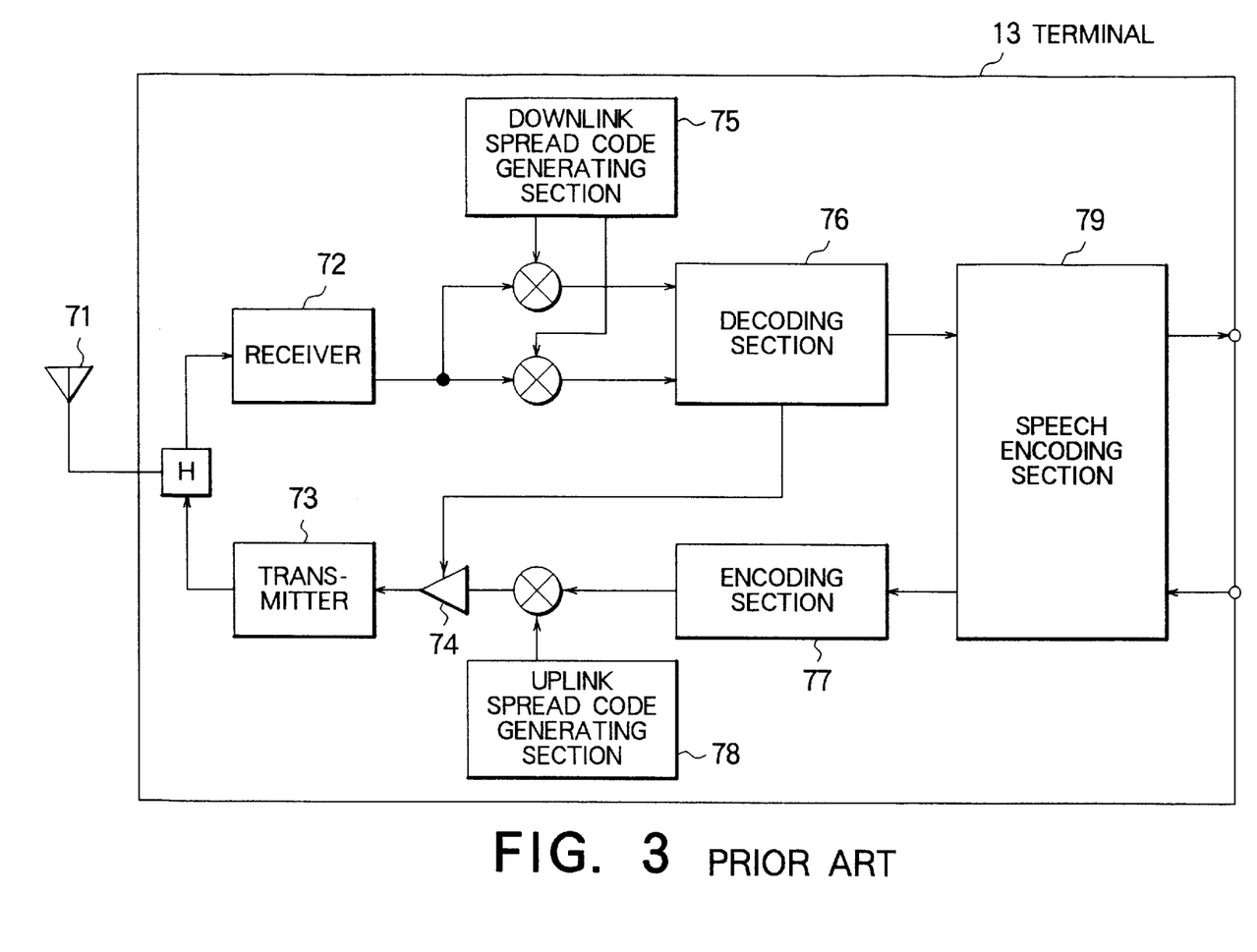
FIG. 3 is a block diagram of a terminal illustrated in FIG. 2.

The equipment-side encoding section 32 encodes the signal transmitted from the host station 11 and superposes the transmission power control signal on the signal. An output signal produced by the equipment-side encoding section 32 is spread by the use of the spread code specific to the base station radio equipment $12_1$ to be transmitted through the equipment-side transmitter 40 and the equipment-side antenna 42 to the terminal 13 by the use of the downlink communication channel. The spread code specific to the base station radio equipment $12_1$ is produced by each equipment-side downlink spread code generating section 35 in the manner such that the base station radio equipments have different codes to enable the terminal 13 to identify the base station radio equipments. FIG. 3 is a block diagram showing the structure of the terminal 13 illustrated in FIG. 2. The terminal 13 comprises a terminal-side antenna 71, a terminal-side receiver 72, a terminal-side transmitter 73, an output gain control section 74, a terminal-side downlink spread code generating section 75, a terminal-side decoding section 76, a terminal-side encoding section 77, a terminal-side uplink spread code generating section 78, and a speech encoding section 79.

The downlink signal on the downlink communication channel transmitted from the base station radio equipment $12_1$ is received via the terminal-side antenna 71 of the terminal 13 and demodulated by the terminal-side receiver 72 into a demodulated signal. The demodulated signal is correlation-demodulated into a correlation-demodulated signal by the use of the spread code specific to the base station radio equipment $12_1$ that is set and produced by the terminal-side downlink spread code generating section 75. The spread code set in the downlink spread code generating section 75 is informed from the host station 11 every time when the communication channel is assigned to the terminal 13.

The correlation-demodulated signal is separated by the terminal-side decoding section 76 into a speech signal and the transmission power control signal. The speech signal and the transmission power control signal are delivered to the terminal-side speech encoding section 79 and the output gain control section 74, respectively. The speech signal delivered to the terminal-side speech encoding section 79 is converted by the terminal-side speech encoding section 79 into a speech. On the other hand, an output signal produced by the terminal-side speech encoding section 79 is encoded by the terminal-side encoding section 77, spread by the use of the terminal-specific spread code produced by the terminal-side uplink spread code generating section 78, controlled in output power by the output gain control section 74 in correspondence to the transmission power control signal, modulated by the terminal-side transmitter 73, and transmitted to the base station radio equipment $12_1$ via the terminal-side antenna 71.

As described above, the base station radio equipment 121 produces the transmission power control signal for the terminal 13 with reference to the magnitude of the reception Eb/No ratio of the uplink communication channel from the terminal 13, and transmits the control signal to the terminal 13 by the use of the downlink communication channel. The terminal 13 controls the transmission power of the uplink communication channel in response to the transmission power control signal which has been received. Therefore, the reception Eb/No ratio received by the base station radio equipment $12_1$ is kept at the level of the reference Eb/No ratio. Thus, the signal quality of the communication channel is maintained.

It is assumed that an abnormal terminal, which does not decrease the transmission power although the transmission power control signal requests the decrease of the transmission power, is present within the service area of the mobile communication network. In this event, when the uplink transmission power of the abnormal terminal becomes excessive, the uplink reception energy of the base station radio equipment $12_1$ in the service area is increased. As a consequence, the communication quality of the abnormal terminal is improved. However, the reception energy thus increased acts as a large interference energy on other normal terminals simultaneously communicating. Accordingly, within the service area in which the abnormal terminal is present, the communication quality of each of the other normal terminals present in the same area is deteriorated. In this event, the other terminals try to recover from the deterioration of the communication quality by increasing the uplink transmission power of the individual terminals. This results in an increase in total transmission power and a reduction in subscriber capacity within the service area.

Furthermore, in the mobile communication network of a CDMA system, communication in an adjacent service area is also carried out by the use of the common carrier frequency. Therefore, the subscriber capacity may also be reduced in another service area adjacent to the service area in consideration.

SUMMARY OF THE INVENTION

In view of the above, it is an object of this invention to provide a transmission power control system which is capable of preventing, even if an abnormal terminal not decreasing transmission power in response to a control signal is present in a service area of the mobile communication network, deterioration of communication quality in other normal terminals and a resultant unfavorable reduction in subscriber capacity within the service area.

A transmission power control system to which this invention is applicable is for a mobile communication network comprising a radio base station having a service area, a host station connected to the radio base station and constituting a fixed station together with the radio base station, and a mobile terminal present within the service area. The transmission power control system comprises, in the radio base station, transmission power control means for carrying out transmission power control of the mobile terminal by transmitting, in dependence upon a signal power of a received signal received from the mobile terminal, the mobile terminal with a control signal requesting a decrease of transmission power of the mobile terminal.

According to this invention, the transmission power control system further comprises in the fixed station: abnormal terminal detecting means connected to the transmission power control means for detecting the mobile terminal as an abnormal terminal when the mobile terminal does not decrease the transmission power after the transmission power control means transmits the mobile terminal with the control signal. The abnormal terminal detecting means transmits, when detects the abnormal terminal, the abnormal terminal with a forced communication-disabling signal which is for use in the abnormal terminal in forcedly disabling communication when the abnormal terminal receives the forced communication-disabling signal.

The transmission power control system according to this invention can detect any abnormal terminal present in the service area of the mobile communication network and forcedly stop or interrupt communication by the abnormal terminal. Thus, it is possible to avoid the deterioration of the communication quality in other normal terminals and to prevent an unfavorable reduction in subscriber capacity resulting from an increase in total transmission power within the service area.

DESCRIPTION OF THE PREFERRED EMBODIMENT

This invention will be described more in detail with reference to the drawing.

Figure 4:
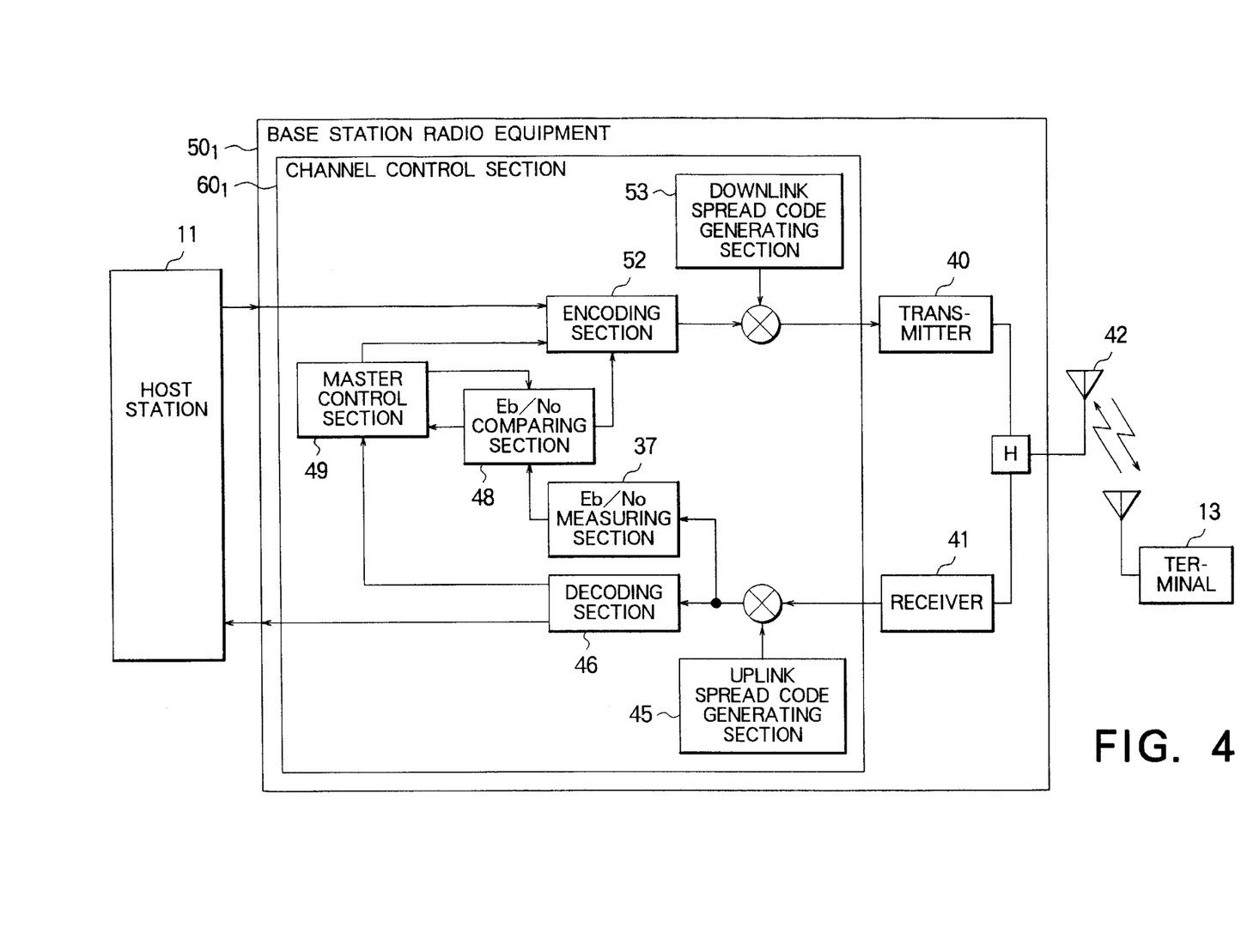
FIG. 4 is a block diagram for use in describing of a transmission power control system according to an embodiment of this invention.

FIG. 4 is a block diagram for use in describing a transmission power communication system according to an embodiment of this invention. The transmission power communication system is for a mobile communication network of a CDMA communication network. In the figure, similar parts similar to those illustrated in FIG. 2 are designated by like reference numerals. Since all of base station radio equipments (radio base stations) $50_1$ through $50_n$, n in number, connected to a host station 11 are similar in structure to one another, the base station radio equipment $50_1$ alone will be described in this embodiment for the sake of convenience. The base station radio equipment $50_1$ comprises channel control sections $60_1$ through $60_m$, m in number. Since the channel control sections $60_1$ through $60_m$ are similar in structure to one another, the channel control section $60_1$ alone will be described for the sake of convenience.

The base station radio equipment $50_1$ connected to the host station 11 comprises an equipment-side receiver 41 for receiving an uplink channel signal from a terminal 13 through an equipment-side antenna 42, the channel control section $60_1$ for processing the signal delivered from the terminal 13 and demodulated by the equipment-side receiver 41, and an equipment-side transmitter 40 supplied with the signal from the channel control section $60_1$ for transmitting the signal through the equipment-side antenna 42.

The channel control section $60_1$ comprises an equipment-side uplink spread code generating section 45, an equipment-side decoding section 46, an Eb/No measuring section 47, an Eb/No comparing section 48, a master control section 49, an equipment-side encoding section 52, and an equipment-side downlink spread code generating section 53.

The equipment-side uplink spread code generating section 45 produces a spread code as a terminal-specific spread code for use in correlation-demodulating the signal demodulated by the equipment-side receiver 41. The equipment-side decoding section 46 decodes the correlation-demodulated signal into a speech signal or a control signal. Simultaneously with the decoding operation, the Eb/No measuring section 47 calculates from the correlation-demodulated signal a reception Eb/No ratio representative of a density ratio of signal power of an uplink communication channel per one bit to noise power. During communication by the terminal 13, the reception Eb/No ratio is repeatedly measured at a predetermined time interval (which is, for example, 1.25 seconds or 2 seconds).

Based on comparison between the reception Eb/No ratio from the Eb/No measuring section 47 and a reference Eb/No ratio set by the master control section 49, the Eb/No comparing section 48 produces a transmission power control signal for controlling transmission power of the terminal 13 and delivers the transmission power control signal to the equipment-side encoding section 52. In addition, the Eb/No comparing section 48 calculates a difference between the reception Eb/No ratio and the reference Eb/No ratio and sends the difference to the master control section 49 every time when the reception Eb/No ratio is supplied at the predetermined interval. The transmission power control signal is produced in the Eb/No comparing section 48 in the following manner. If the reception Eb/No ratio is greater than the reference Eb/No ratio, this means that the terminal 13 carries out transmission with excessive power. In this event, the transmission power control signal requesting to decrease uplink transmission power is produced. On the other hand, if the reception Eb/No ratio is smaller than the reference Eb/No ratio, this means that the terminal 13 carries out transmission with insufficient power. In this event, the transmission power control signal requesting to increase the uplink transmission power is produced.

The master control section 49 stores data related to the reference Eb/No ratio and a threshold value. As the reference Eb/No ratio, a same value is set in each of the channel control sections $60_1$ through $60_n$ so that equivalent communication quality is maintained in all terminals currently communicating. The threshold value is determined taking into account a tolerance in transmission power control. In addition, the master control section 49 are supplied a plurality of number of times (for example, 1600 times: 1.25 or 2 second intervals) with values of the difference between the reception Eb/No ratio and the reference Eb/No ratio calculated by the Eb/No comparing section 48 and calculates their average to be compared with the threshold value. If the average is greater than the threshold value as a result of comparison, it is judged that the terminal 13 is an abnormal terminal. Then, a forced interruption signal (or a forced communication-disabling signal) to forcedly interrupt the communication by the terminal 13 is produced and delivered to the equipment-side encoding section 52.

The equipment-side encoding section 52 superposes the transmission power control signal from the Eb/No comparing section 48 upon the forced interruption signal (or the forced communication-disabling signal) from the master control section 49 or a speech signal from the host station 11 and encodes these signals into an encoded signal. The equipment-side downlink spread code generating section 53 produces the spread code specific to the base station radio equipment $50_1$ and spreads the encoded signal by the use of the spread code to transmit a resultant signal to the terminal 13 through the equipment-side transmitter 40 and the equipment-side antenna 42.

Now, description will be made about an overall operation of the mobile communication network according to this invention. The signal transmitted from the terminal 13 is received by the base station radio equipment $50_1$ through the equipment-side antenna 42 and delivers to the host station 11. On the other hand, the signal transmitted from the host station 11 is transmitted from the base station radio equipment $50_1$ to the terminal 13 through the equipment-side antenna 42.

In the base station radio equipment $50_1$, the signal having been received is demodulated by the equipment-side receiver 41 and demodulated by the channel control section $60_1$ assigned thereto. Specifically, the demodulated signal is correlation-demodulated by the use of the terminal-specific spread code from the equipment-side uplink spread code generating section 36 to be delivered to the equipment-side decoding section 46 and the Eb/No measuring section 47. The equipment-side decoding section 46 decodes the correlation-demodulated signal into the speech signal or the control signal. The speech signal is delivered to the host station 11 while the control signal is delivered to the master control section 49. Simultaneously, the Eb/No measuring section 47 measures the reception Eb/No ratio of the correlation-demodulated signal and delivers a measured value to the Eb/No comparing section 48.

The Eb/No comparing section 48 compares the reception Eb/No ratio from the Eb/No measuring section 47 and the reference Eb/No ratio from the master control section 49. If the reception Eb/No ratio is greater than the reference Eb/No ratio as a result of comparison, the transmission power control signal requesting to decrease the uplink transmission power is produced. If the reception Eb/No ratio is smaller than the reference Eb/No ratio, the transmission power control signal requesting to increase the uplink transmission power is produced. The transmission power control signal is delivered to the equipment-side encoding section 52. The transmission power control signal is spread by the equipment-side downlink spread code generating section 53 and then transmitted to the terminal 13 through the equipment-side transmitter 40 and the equipment-side antenna 42.

Upon comparing the reception Eb/No ratio and the reference Eb/No ratio, the Eb/No comparing section 48 calculates the difference between the reception Eb/No ratio and the reference Eb/No ratio and sends a calculated value to the master control section 49. The master control section 49 calculates the average of the difference from the values supplied a plurality of number of times and compares the average with the threshold value. If the average is greater than the threshold value as a result of comparison, it is judged that the terminal 13 currently communicating is the abnormal terminal. Then, the forced interruption signal to forcedly disconnect the terminal 13 is produced and delivered to the equipment-side encoding section 52.

Specifically, the comparison between the average and the threshold value is carried out in the Eb/No comparing section 48 in the following manner. For example, it is assumed that the reception Eb/No ratio is equal to 10 dB and the reference Eb/No ratio is equal to 7 dB. In this event, the reception Eb/No ratio is greater than the reference Eb/No ratio, representing that the terminal 13 carries out transmission with excessive power. Therefore, the transmission power control signal requesting to decrease the transmission power is delivered to the equipment-side encoding section 52. Simultaneously, the difference 3 dB between the reception Eb/No ratio and the reference Eb/No ratio is delivered to the master control section 49. Thereafter, the transmission power control signal encoded by the equipment-side encoding section 52 is transmitted to the terminal 13.

It is assumed that the reception Eb/No ratio is equal to 12 dB as a result of a next measurement. In this event, the reception Eb/No ratio is greater than the reference Eb/No ratio, representing that the terminal 13 still carries out transmission with the excessive power. Therefore, the transmission power control signal requesting to decrease the uplink transmission power is delivered again to the equipment-side encoding section 52. Simultaneously, the difference 5 dB between the reference Eb/No ratio and the reception Eb/No ratio is delivered to the master control section 49. Thereafter, the transmission power control signal encoded by the equipment-side encoding section 52 is transmitted to the terminal 13.

It is assumed that, as a result of repetition of the measurement and the comparison mentioned above, the reception Eb/No ratio is equal to 10 dB, 12 dB, 11 db, and 15 dB. In this event, the average of the difference between the reception Eb/No ratio and the reference Eb/No ratio is calculated as $\{(10-7)+(12-7)+(11-7)+(15-7)\}/4=5$ [dB].

Subsequently, comparison is made between the threshold value, for example, set at 2.5 dB and the above-mentioned average. In this event, the average is greater than the threshold value, representing that the transmission power control exactly as requested by the base station radio equipment $50_1$ is not carried out in the terminal 13. Therefore, this terminal 13 is judged as the abnormal terminal not decreasing the transmission power in response to the transmission power control signal. The forced interruption signal for the abnormal terminal is produced and delivered to the equipment-side encoding section 52.

The equipment-side encoding section 52 superposes the transmission power control signal from the Eb/No comparing section 48 upon either the forced interruption signal (namely, the forced communication-disabling signal) from the master control section 49 or the speech signal from the host station 11 and encodes these signals into the encoded signal. The encoded signal is spread by the use of the spread code specific to the base station radio equipment $50_1$ to be transmitted to the terminal 13 through the equipment-side transmitter 40 and the equipment-side antenna 42. Supplied with the forced interruption signal (namely, the forced communication-disabling signal), the terminal 13 immediately stops the transmission on the uplink channel and interrupts the communication.

Figure 5:
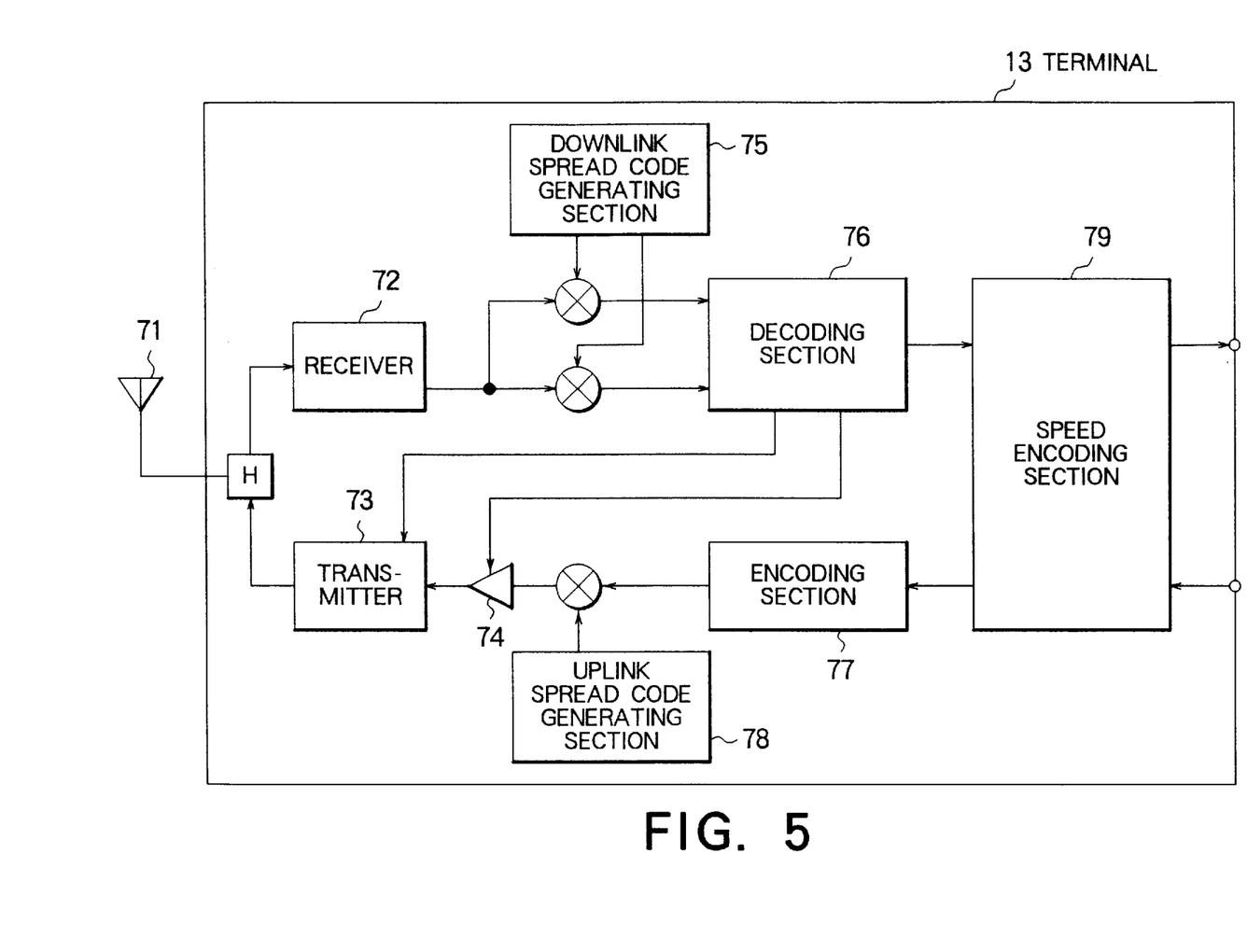
FIG. 5 is a block diagram of a terminal illustrated in FIG. 4.

Referring to FIG. 5, the terminal 13 of FIG. 4 is illustrated. The terminal 13 illustrated in FIG. 5 is similar to the terminal 13 illustrated in FIG. 3 except for the following. That is, the forced interruption signal (namely, the forced communication-disabling signal) is received by the receiver 72 of the terminal 13 and is decoded by the decoding section 76. The forced interruption signal (namely, the forced communication-disabling signal) decoded by the decoding section 76 is delivered to the transmitter 73. In response to the forced interruption signal (namely, the forced communication-disabling signal), the transmitter 73 immediately stops the transmission thereof on the uplink channel and interrupts the communication.

Summarizing in FIG. 4, a transmission power control system is for a mobile communication network comprising a radio base station ($50_1$) having a service area, a host station (11) connected to the radio base station and constituting a fixed station together with the radio base station, and a mobile terminal (13) present within the service area. The transmission power control system comprises, in the radio base station, a transmission power control part (37, 48, 52) for carrying out transmission power control of the mobile terminal by transmitting, in dependence upon a signal power of a received signal received from the mobile terminal, the mobile terminal with a control signal requesting a decrease of transmission power of the mobile terminal.

The transmission power control system further comprises, in the fixed station, an abnormal terminal detecting part (48, 49, 52) connected to the transmission power control part for detecting the mobile terminal as an abnormal terminal when the mobile terminal does not decrease the transmission power after the transmission power control part transmits the mobile terminal with the control signal. The abnormal terminal detecting part transmits, when detects the abnormal terminal, the abnormal terminal with a forced communication-disabling signal which is for use in the abnormal terminal in forcedly disabling communication when the abnormal terminal receives the forced communication-disabling signal.

Preferably, the abnormal terminal detecting part is disposed in the radio base station.

Typically, the mobile communication network is a CDMA (Code Division Multiple Access) communication network.

Preferably, the transmission power control part carries out the transmission power control of the mobile terminal by transmitting, when a reception power ratio of the signal power of the received signal to noise power of the received signal is greater than a predetermined reference ratio, the mobile terminal with the control signal.

In this case, the abnormal terminal detecting part comprises: a difference producing part (48) connected to the transmission power control part for periodically producing differences a prescribed number N (N is an integer greater than one) of times at a predetermined period after the transmission power control part transmits the mobile terminal with the control signal, each of the differences being given by subtracting the predetermined reference ratio from the reception power ratio at a time; and a judging part (49, 52) connected to the difference producing part for judging the mobile terminal as the abnormal terminal when an average value of the differences is greater than a preselected threshold value, the judging part transmitting the mobile terminal with the forced communication-disabling signal when the judging part judges the mobile terminal as the abnormal terminal.

In FIG. 5, the mobile terminal comprises: a transmitting part (73) for carrying out a transmitting operation of transmitting a transmission signal to the radio base station to make the radio base station receive the transmission signal as the received signal; and a receiving part (72, 76) for receiving the forced communication-disabling signal from the radio base station as a received communication-disabling signal. The transmitting part is connected to the receiving part to stop the transmitting operation in response to the received communication-disabling signal such that the communication is disabled in the mobile terminal.

In the above-described transmission power control system, it is possible to stop or interrupt the communication by the abnormal terminal present within the service area as immediately as the abnormal terminal is detected. Therefore, it is possible to avoid deterioration of communication quality in other normal terminals 13 currently communicating within the service area and to prevent an unfavorable reduction in subscriber capacity resulting from an increase in total transmission power within the service area. In addition, it is possible to prevent a reduction in subscriber capacity within an adjacent service area where communication is carried out by the use of the same carrier frequency.

In the foregoing, this invention has been described in conjunction with the preferred embodiment thereof. However, the transmission power control system of this invention is not restricted to the structure in the above-mentioned embodiment. The scope of this invention includes mobile communication networks with various modifications and changes introduced into the structure of the foregoing embodiment.

As described above, the transmission power control system of this invention has a remarkable effect of avoiding, even if the abnormal terminal not decreasing the transmission power although the control signal requests the decrease of the transmission power is present within the service area of the mobile communication network, the deterioration of the communication quality in other normal terminals and preventing the unfavorable reduction in subscriber capacity resulting from the increase in total transmission power within the service area.

What is claimed is:

1. A transmission power control system for a mobile communication network comprising a radio base station (50$_1$) having a service area, a host station (11) connected to said radio base station and constituting a fixed station together with said radio base station, and a mobile terminal (13) present within said service area, said transmission power control system comprising, in said radio base station, transmission power control means (37, 48, 52) for carrying out transmission power control of said mobile terminal by transmitting, in dependence upon a signal power of a received signal received from said mobile terminal, said mobile terminal with a control signal requesting a decrease of transmission power of said mobile terminal, said transmission power control system further comprising in said fixed station:

abnormal terminal detecting means (48, 49, 52) connected to said transmission power control means for detecting said mobile terminal as an abnormal terminal when said mobile terminal does not decrease the transmission power after said transmission power control means transmits said mobile terminal with said control signal, said abnormal terminal detecting means transmitting, when detects said abnormal terminal, said abnormal terminal with a forced communication-disabling signal which is for use in said abnormal terminal in forcedly disabling communication when said abnormal terminal receives said forced communication-disabling signal.

2. A transmission power control system as claimed in claim 1, wherein said abnormal terminal detecting means is disposed in said radio base station.

3. A transmission power control system as claimed in claim 1, wherein said mobile communication network is a CDMA (Code Division Multiple Access) communication network.

4. A transmission power control system as claimed in claim 1, wherein said transmission power control means carries out the transmission power control of said mobile terminal by transmitting, when a reception power ratio of the signal power of said received signal to noise power of said received signal is greater than a predetermined reference ratio, said mobile terminal with said control signal.

5. A transmission power control system as claimed in claim 4, wherein said abnormal terminal detecting means comprises:

difference producing means (48) connected to said transmission power control means for periodically producing differences a prescribed number N (N is an integer greater than one) of times at a predetermined period after said transmission power control means transmits said mobile terminal with said control signal, each of said differences being given by subtracting the predetermined reference ratio from the reception power ratio at a time; and judging means (49, 52) connected to said difference producing means for judging said mobile terminal as said abnormal terminal when an average value of said differences is greater than a preselected threshold value, said judging means transmitting said mobile terminal with said forced communication-disabling signal when said judging means judges said mobile terminal as said abnormal terminal.

6. A transmission power control system as claimed in claim 1, wherein said mobile terminal comprises:

transmitting means (73) for carrying out a transmitting operation of transmitting a transmission signal to said radio base station to make said radio base station receive said transmission signal as said received signal; and receiving means (72, 76) for receiving said forced communication-disabling signal from said radio base station as a received communication-disabling signal; said transmitting means being connected to said receiving means to stop said transmitting operation in response to said received communication-disabling signal such that the communication is disabled in said mobile terminal.

7. A transmission power control system for a mobile communication network comprising a radio base station (50₁) having a service area and a mobile terminal (13) present within said service area, said transmission power control system comprising, in said radio base station, transmission power control means (37, 48, 52) for carrying out transmission power control of said mobile terminal by transmitting, in dependence upon a signal power of a received signal received from said mobile terminal, said mobile terminal with a control signal requesting a decrease of transmission power of said mobile terminal, said transmission power control system further comprising in said radio base station:

abnormal terminal detecting means (48, 49, 52) connected to said transmission power control means for detecting said mobile terminal as an abnormal terminal when said mobile terminal does not decrease the transmission power after said transmission power control means transmits said mobile terminal with said control signal, said abnormal terminal detecting means transmitting, when detects said abnormal terminal, said abnormal terminal with a forced communication-disabling signal which is for use in said abnormal terminal in forcedly disabling communication when said abnormal terminal receives said forced communication-disabling signal.

8. A transmission power control system as claimed in claim 7, wherein said mobile communication network is a CDMA (Code Division Multiple Access) communication network.

9. A transmission power control system as claimed in claim 7, wherein said transmission power control means carries out the transmission power control of said mobile terminal by transmitting, when a reception power ratio of the signal power of said received signal to noise power of said received signal is greater than a predetermined reference ratio, said mobile terminal with said control signal.

10. A transmission power control system as claimed in claim 9, wherein said abnormal terminal detecting means comprises:

difference producing means (48) connected to said transmission power control means for periodically producing differences a prescribed number N (N is an integer greater than one) of times at a predetermined period after said transmission power control means transmits said mobile terminal with said control signal, each of said differences being given by subtracting the predetermined reference ratio from the reception power ratio at a time; and judging means (49, 52) connected to said difference producing means for judging said mobile terminal as said abnormal terminal when an average value of said differences is greater than a preselected threshold value, said judging means transmitting said mobile terminal with said forced communication-disabling signal when said judging means judges said mobile terminal as said abnormal terminal.

11. A transmission power control system as claimed in claim 7, wherein said mobile terminal comprises:

transmitting means (73) for carrying out a transmitting operation of transmitting a transmission signal to said radio base station to make said radio base station receive said transmission signal as said received signal; and receiving means (72, 76) for receiving said forced communication-disabling signal from said radio base station as a received communication-disabling signal;

said transmitting means being connected to said receiving means to stop said transmitting operation in response to said received communication-disabling signal such that the communication is disabled in said mobile terminal.

* * * * *